(12) United States Patent
Gallienne et al.

(10) Patent No.: US 6,746,070 B2
(45) Date of Patent: Jun. 8, 2004

(54) FIXING DEVICE FOR FIXING A SEAT TO A VEHICLE FLOOR, AND A SEAT AND A VEHICLE INCLUDING SUCH A FIXING DEVICE

(75) Inventors: Didier Gallienne, Landigou (FR); Gilles Sourdillon, Flers (FR); Gilles Dusquesnay, Briouze (FR)

(73) Assignee: Faurecia Sieges d'Automobile S.A., Nanterre (FR)

( * ) Notice: Subject to any disclaimer, the term of this patent is extended or adjusted under 35 U.S.C. 154(b) by 0 days.

(21) Appl. No.: 10/347,047

(22) Filed: Jan. 17, 2003

(65) Prior Publication Data

US 2003/0155789 A1 Aug. 21, 2003

(30) Foreign Application Priority Data

Jan. 22, 2002 (FR) .............................. 02 00749

(51) Int. Cl.$^7$ .............................. B60N 2/12; B60N 2/30
(52) U.S. Cl. .............................. 296/65.05; 296/65.03; 296/65.09; 297/336
(58) Field of Search .............................. 296/63, 65.01, 296/65.03, 65.05–65.09; 297/335, 336

(56) References Cited

U.S. PATENT DOCUMENTS

| | | | | |
|---|---|---|---|---|
| 4,784,425 A | * | 11/1988 | Bateman ................... | 296/65.07 |
| 5,038,437 A | * | 8/1991 | Russell et al. ............... | 16/266 |
| 5,330,245 A | | 7/1994 | Boisset | |
| 5,558,386 A | * | 9/1996 | Tilly et al. ................ | 296/65.05 |
| 5,775,763 A | * | 7/1998 | Glinter et al. ............. | 296/65.03 |
| 5,997,069 A | * | 12/1999 | Coffey et al. .............. | 296/65.03 |
| 6,174,017 B1 | * | 1/2001 | Salani et al. .............. | 296/65.03 |
| 6,283,550 B1 | * | 9/2001 | Vialatte et al. ............ | 297/335 |
| 6,478,358 B1 | * | 11/2002 | Okazaki et al. ........... | 296/65.09 |
| 6,485,080 B2 | * | 11/2002 | Hansen et al. ........... | 296/65.03 |

FOREIGN PATENT DOCUMENTS

| | | |
|---|---|---|
| DE | 2 981 03 33 | 11/1999 |
| EP | 0 546 908 | 6/1993 |
| EP | 0 781 681 | 7/1997 |
| FR | 2 780 351 | 12/1999 |
| FR | 2 796 344 | 1/2001 |

OTHER PUBLICATIONS

French Search Report 0200749 dated Oct. 2, 2002.

* cited by examiner

*Primary Examiner*—Gregory Blankenship
(74) *Attorney, Agent, or Firm*—McCracken & Frank LLP (57) ABSTRACT

A fixing device for fixing a seat to a floor of a vehicle, the seat including a seat proper which extends between a front end and a rear end. The fixing device comprises a base serving to support the seat proper, and provided with a rear coupling and with a front coupling, the front coupling comprising an anchoring fork serving to co-operate with a horizontal rod secured to the floor to allow the seat to be pivoted between an in-use position and a tilted-forwards position, the anchoring fork being provided with a finger, and the device further comprising an elastically deformable blade that is secured to the floor and that serves to co-operate with the finger to lock the seat proper to prevent it from pivoting when it is in its tilted-forwards position.

9 Claims, 6 Drawing Sheets

FIXING DEVICE FOR FIXING A SEAT TO A VEHICLE FLOOR, AND A SEAT AND A VEHICLE INCLUDING SUCH A FIXING DEVICE

FIELD OF THE INVENTION

The present invention relates to a fixing device for fixing a seat to a vehicle floor, and also relates to a seat and to a vehicle including such a fixing device.

More particularly, the invention relates to a fixing device for fixing a seat to a floor of a vehicle, the seat including a seat proper which extends between a front end and a rear end, and the fixing device comprising:
- a base serving to support the seat proper; and
- a rear coupling and a front coupling that are secured to the base, the front coupling comprising an anchoring fork having an open recess serving to cooperate with a horizontal rod secured to the floor to allow the seat to be pivoted between an in-use position in which the rear coupling co-operates with fixing means on the floor to hold the seat proper substantially horizontal, and a tilted-forwards position in which the rear coupling no longer co-operates with the fixing means on the floor so as to enable the seat proper to be inclined relative to the horizontal.

BACKGROUND OF THE INVENTION

Such fixing devices are known in particular from Patent Application FR 2 780 351. With that type of fixing device, holding the seat proper of the seat stationary in its tilted-forwards position requires the presence of a separate hook mounted on the anchoring fork, said hook being mounted to move relative to the fork by means of a spring, and it being necessary for the hook to have a shape suitable for enabling it to be retracted from or hooked onto a second rod mounted parallel to the first pivot rod. It is therefore quite difficult to put the fixing device in place on the floor of the vehicle and to anchor it to said floor. Moreover, when the spring does not provide suitable resilient return, the seat is not guaranteed to be locked in its tilted-forwards position, and that can cause the seat to pivot accidentally from its tilted-forwards position towards its horizontal position.

OBJECTS AND SUMMARY OF THE INVENTION

A particular object of the present invention is to mitigate those drawbacks by providing a fixing device for fixing a seat to a vehicle floor, which fixing device is easy to put in place on said floor of the vehicle while also guaranteeing excellent locking of the seat proper of the seat in its tilted-forwards position in which the seat proper is inclined to some extent relative to the horizontal, i.e. relative to the floor of the vehicle.

To this end, in the invention, in a fixing device of the type in question, the anchoring fork is provided with a finger which projects substantially forwards when the seat is in the in-use position, and the device further comprises an elastically deformable blade that is secured to the floor and that is provided with a through opening, and the elastically deformable blade is disposed in register with the finger on the anchoring fork so as to make it possible firstly for the finger to push away said elastically deformable blade by deforming it, while the seat proper is pivoting from its in-use position to its tilted-forwards position, and secondly, when the seat proper is in its tilted-forwards position, for the finger to engage in the opening of the blade by said blade returning resiliently, so as to lock the seat proper to prevent it from pivoting from its tilted-forwards position to its in-use position.

By means of these provisions, the seat is easy to put in place on the floor and is easy to remove from the vehicle, and the front coupling of the fixing device makes it possible to lock the seat proper merely by the presence of the elastically deformable blade to prevent said seat proper from pivoting towards its in-use position when it is disposed in its tilted-forwards position.

In preferred embodiments of the invention, it is optionally possible, in addition, to use any of the following provisions:
- the through opening in the elastically deformable blade has a shape that is complementary to the shape of the finger on the anchoring fork;
- the finger has a top face which defines a bottom portion of the open recess;
- the finger has a bottom face which, when the seat proper is in the tilted-forwards position, serves to come into abutment against an abutment secured to the floor;
- the abutment secured to the floor is in the form of an abutment fork provided with a notch defined by two substantially vertical side prongs separated by a substantially horizontal middle portion, and the bottom face of the finger is provided with a projecting element serving to come to be received in the notch in the abutment fork and facing the middle portion of said notch, when the seat proper is in the tilted-forwards position, so as to prevent the finger from being moved substantially vertically in the opening in the elastically deformable blade;
- the elastically deformable blade and the abutment secured to the floor are made in a single piece; and
- the base comprises at least one first rail on which the front coupling and the rear coupling are mounted, and a second rail which is mounted to slide on the first rail and which serves to be fixed to the seat proper of the seat to enable the seat proper to be moved forwards and backwards.

In addition, the invention also provides a vehicle seat including a seat proper which is mounted on the floor of the vehicle by means of at least one fixing device as defined above.

The invention also provides a motor vehicle including at least one seat as defined above, the vehicle including a transverse horizontal rod that is secured to the floor and a setback in which the elastically deformable blade is disposed at least in part.

BRIEF DESCRIPTION OF THE DRAWINGS

Other characteristics and advantages of the invention will appear on reading the following description of two embodiments of it, given by way of non-limiting example, with reference to the accompanying drawings.

In the drawings.

MORE DETAILED DESCRIPTION

In the various figures, like references designate identical or similar elements.

Figure 1:
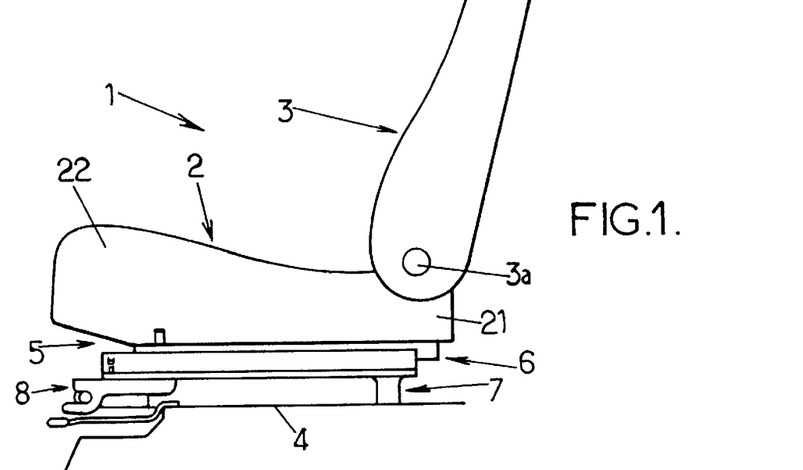
FIG. 1 is a side view of a vehicle seat in an in-use position, and equipped with a first embodiment of a fixing device of the invention.

In a manner known per se, the motor vehicle seat 1 shown in FIG. 1 comprises a seat proper 2 and a seat back 3.

The seat proper 2 extends between a front end 22 remote from the seat back and a rear end 21 close to the seat back. The seat proper 2 is designed to be fixed to the floor 4 of a motor vehicle by means of a fixing device 5. Said fixing device 5 comprises a base 6 which is designed to support the bottom face of the seat proper 2 and which extends substantially horizontally between the front end and a rear end. The fixing device 5 further comprises at least two rear couplings 7, only one of which is visible in FIG. 1, and two front couplings 8, only one of which is visible in FIG. 1. The rear couplings 7 and the front couplings 8 are respectively secured to the rear end and to the front end of the base 6.

When the seat is in a normal in-use position, the rear couplings 7 are locked to the floor 4 of the vehicle by any known means, e.g. by screw means. The rear couplings 7 may also be formed by retractable devices making it possible for the rear of the seat proper 2 to be locked and unlocked rapidly relative to the floor of the vehicle.

In addition, the seat back 3 of the seat is connected to the seat proper 2 by means of a conventional hinge mechanism 3a serving to enable the passenger in said seat to adjust the inclination of the seat back. The hinge mechanism 3A is, in particular, adapted to enable the seat back 3 to be inclined and to be tilted forwards so that it is disposed substantially horizontally and against the top face of the seat proper 2.

Figure 2:
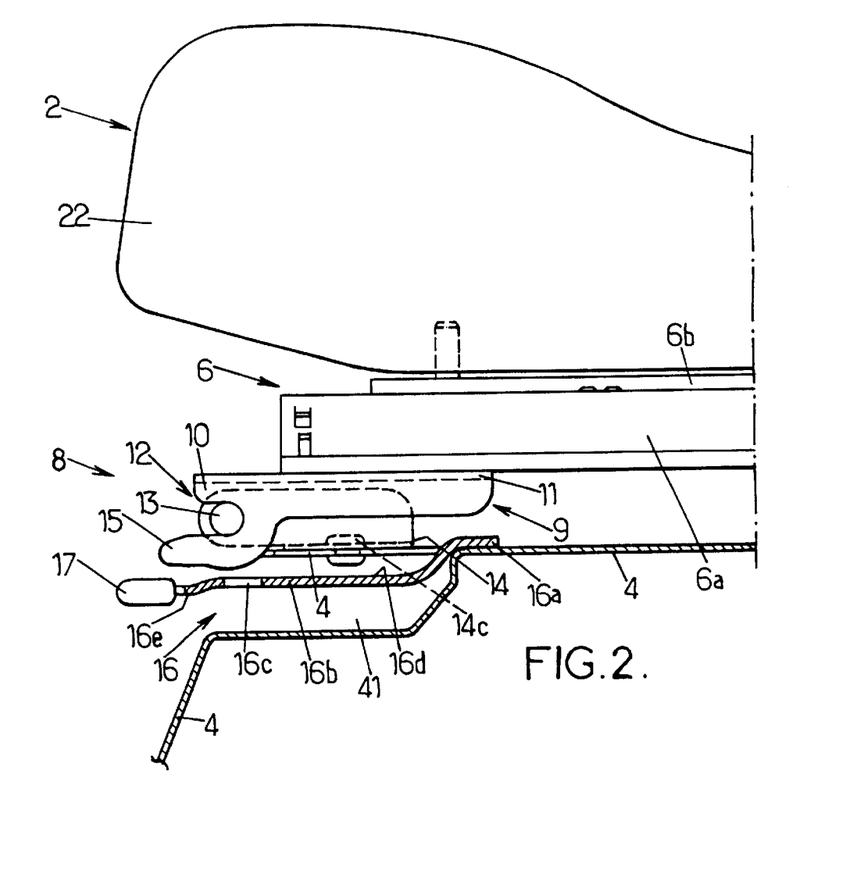
FIG. 2 is an enlarged fragmentary view of FIG. 1 showing the front coupling of the fixing device in its normal in-use position.

As can be seen in more detail in FIG. 2, the front coupling 8 of the fixing device comprises an anchoring fork 9 which may be formed from a sheet of metal that is stamped and folded. The anchoring fork has a vertical web 10 that extends substantially longitudinally relative to the direction of the seat and from which a horizontal flap 11 extends that is formed integrally with the web and that is fixed to the base 5 supporting the seat proper 2. The vertical web 10 of the anchoring fork 9 extends between a rear end and a front end that is provided with an oblong recess 12 which is open facing forwards and which receives a horizontal rod 13 that is secured to the floor 4 of the vehicle. More precisely, the horizontal rod 13, which is disposed transversely relative to the seat proper 2, is connected to the floor 4 of the vehicle by means of a support 14 which is itself fixed to the floor 4 of the vehicle.

For example, said support 14 may be in the form of two angle brackets (only one of which is shown in the figures) disposed on either side of the horizontal rod 13. Each angle bracket is made up of a vertical flange to which the corresponding end of the horizontal rod 13 is fixed, and of a horizontal flange disposed on the floor of the vehicle and fixed thereto by suitable fixing means such as screws, rivets 14C, or welding.

The horizontal rod 13 co-operating with the open recess 12 in the anchoring fork 9 allows the seat proper 2 to pivot between an in-use position (FIG. 2) in which the rear couplings 7 co-operate with fixing means on the floor to hold the seat proper 2 substantially horizontally, the front couplings 8 also being fixed to the floor, and a tilted-forwards position (FIG. 3) in which the rear couplings 7 of the fixing device no longer co-operate with the fixing means on the floor 4 so as to enable the seat proper 2 to tilt forwards relative to the horizontal and about the horizontal rod 13 on the floor.

As can also be seen in FIG. 2, the bottom portion of the open recess 12 in the anchoring fork 9 is defined by a finger 15 which extends substantially horizontally when the seat is in the in-use position. The finger 15 extends forwards and beyond the open recess 12 in the anchoring fork 9. Said finger 15 serves, when the seat proper is pivoted from its in-use position to its tilted-forwards position, to co-operate with the elastically deformable blade 16 which is secured to the floor 4 and which is disposed substantially in register with the finger 15 and therefore with the vertical web 10 of the fork 9 in the example in question.

The elastically deformable blade or spring blade 16 has a first end 16a that is curved step-like, and that is fixed to the floor 4 of the vehicle, a middle portion 16b that extends longitudinally and horizontally below the vertical web 10 of the anchoring fork 9, and a free end 16e that is provided with graspable means 17 such as a handle. The first end 16a of the blade 16 may be fixed to the floor of the vehicle by screwing or by welding, or by any other suitable means. The middle portion 16b of the spring blade 16 is also provided with a through opening 16c of shape complementary to the shape of the finger 15 on the anchoring fork 9 and which serves to cooperate with said finger 15, as described below.

When a user wishes to tilt the seat forwards, said user firstly actuates the hinge mechanism 8 (FIG. 1) in order to fold down the seat back until it is horizontal and against the top face of the seat proper 2. Then, the user unlocks the two rear couplings 7 of the fixing device 5 in order to enable the seat proper 2 to be tilted forwards.

When the seat proper 2 is tilted forwards, the anchoring fork 9 pivots about the horizontal rod 13, and the finger 15 on the anchoring fork bears against the top face 16d of the elastically deformable blade 16. As the seat proper 2 is tilting forwards, the finger 15 pushes said elastically deformable blade 16 away downwards. To this end, the floor of the vehicle may be provided with a setback 41 which receives the elastically deformable blade 16 or more exactly its middle portion 16b and its free end 16c.

When the seat proper 2 reaches its tilted-forwards position, in which the seat proper 2 may, for example, form an angle of about 75° relative to the floor of the vehicle, the finger 15 of the anchoring fork 9 is then substantially disposed in register with the opening 16c in the elastically deformable blade 16. The spring effect of the elastically deformable blade 16 then makes it possible for the finger 15 to be engaged directly in the opening 16c in said blade 16, which makes it possible for the seat proper 2 to be locked automatically in the tilted-forwards position (FIG. 3).

In a variant embodiment (not shown in FIGS. 2 and 3), the elastically deformable blade 16 may also be secured directly to the support 14 to which the horizontal rod 13 is also fixed.

Figure 3:
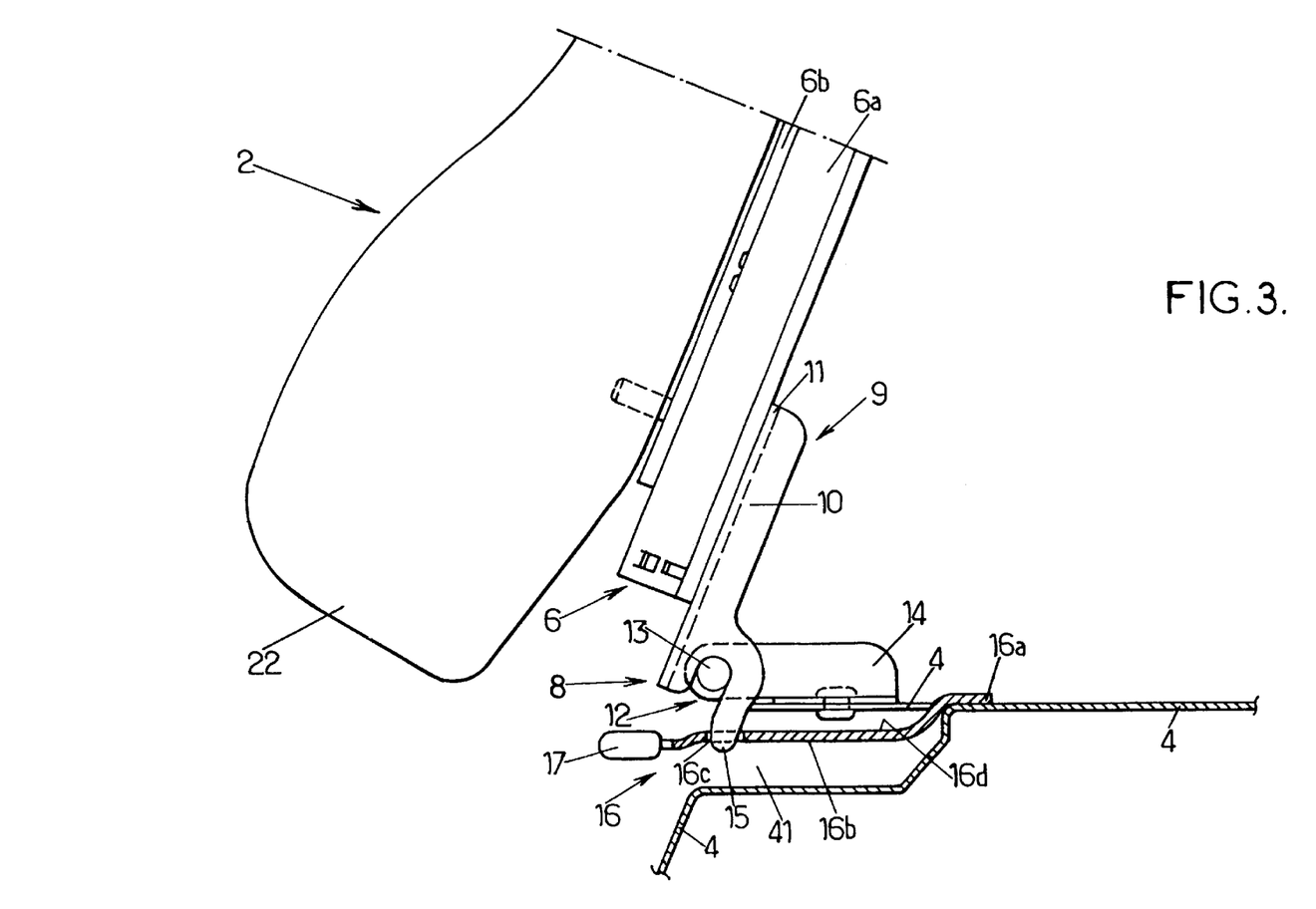
FIG. 3 is a view similar to FIG. 2, with the front coupling of the device being in the tilted-forwards position.

As can also be seen in FIGS. 2 and 3, the base 6 of the fixing device may be formed by a runner system comprising a first rail 6a on which the front coupling 8 and the rear coupling 7 are mounted, and a second rail 6b which is mounted to slide on the first rail 6a and which is designed to be fixed to the seat proper 2 of the seat to enable the seat proper to be moved forwards and backwards when said seat proper is in the normal in-use position.

Naturally, the base 6 may also be formed by any other support making it possible to establish coupling between the bottom face of the seat proper 2 and the front and rear couplings 8, 7 of the fixing device.

In this embodiment, when the seat proper 2 is in the tilted-forwards position (FIG. 3), the seat proper 2 may be removed from the floor of the vehicle and extracted from the vehicle merely by being moved vertically so as to release the open recess 12 from the transverse horizontal rod 13 connected to the floor 4 of the vehicle.

Advantageously, the second embodiment shown in FIGS. 4 to 7 also makes it possible to lock the seat proper 2 so as to prevent it from moving substantially vertically relative to the floor of the vehicle when said seat proper 2 is in the tilted-forwards position.

In this embodiment shown in FIGS. 4 to 7, at the front end of its bottom face, the finger 15 of the anchoring fork 9 is provided with a projecting element 15a serving to co-operate with the elastically deformable blade 18 and with an abutment fork 19. The abutment fork 19 (shown in FIG. 6) is provided with a notch 20 that is open facing downwards towards the floor 4 of the vehicle, or more exactly towards the setback 41 provided in the floor of the vehicle. The notch 20 is defined by two substantially vertical side prongs 19a which are separated from each other by a substantially horizontal middle portion 19b. The abutment fork 19 is further provide with a horizontal flange 19c and a rear end 19e which, in the example in question, is formed integrally with the rear end 18a of the elastically deformable blade 18. The elastically deformable blade 18 also has a middle portion 18b and a free end 18e provided with a handle 17. The horizontal flange 19c of the abutment fork 19 is also provided with a through opening 19d to enable the abutment fork to be fastened to the support 14, e.g. by means of a nut or of a rivet, or of any suitable fixing means.

Figure 8:
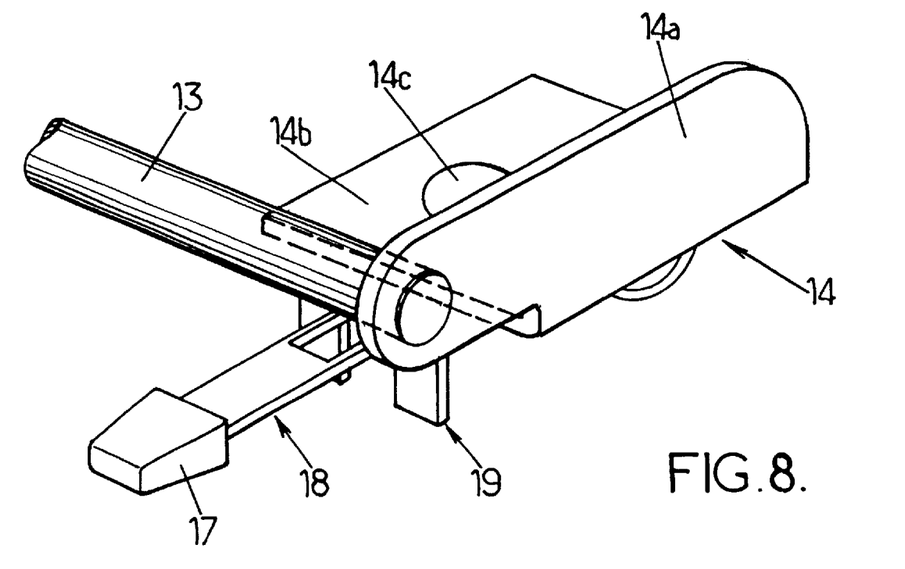
FIG. 8 is a diagrammatic perspective view of the fixing system for fixing an elastically deformable blade and the pivot rod about which the seat pivots, which fixing system is designed to be fixed to the floor of the vehicle.
Figure 9:
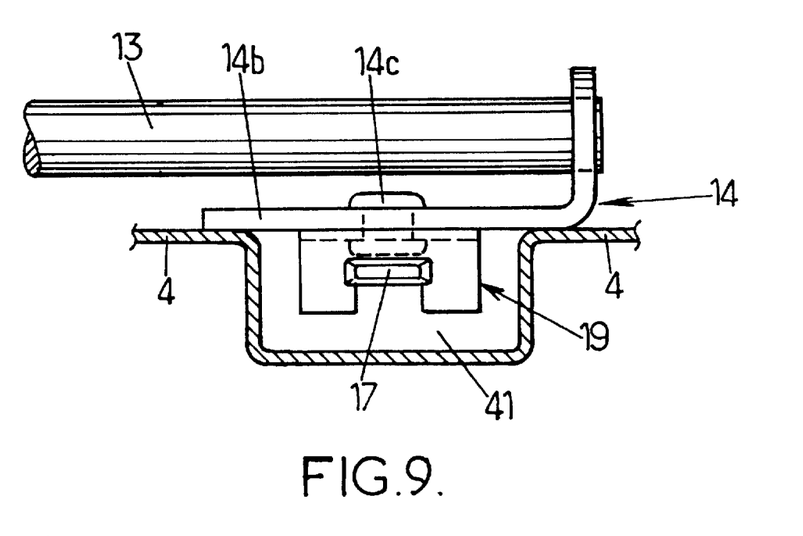
FIG. 9 is a diagrammatic view in section of the fixing system shown in FIG. 8, when it is fixed to the floor of the vehicle.

To this end, and as shown in FIGS. 8 and 9, the corresponding angle bracket 14 is made up of a vertical flange 14a for fixing and retaining the horizontal rod 13, and of a horizontal flange 14b adapted to make it possible, e.g. by means of a rivet 14c, to fix the horizontal flange 19c of the abutment fork 19 that is formed integrally with the blade 18.

The angle bracket 14 may be fixed to the floor 4 of the vehicle by screwing, riveting, or welding.

The through opening 18c provided in the elastically deformable blade 18 has a front edge 18f which extends, in the forward direction, beyond the middle portion 19b of the abutment fork 19, and a rear edge 18g which extends, in the backward direction of the seat, beyond the middle portion 19b of said abutment fork 19.

Figure 4:
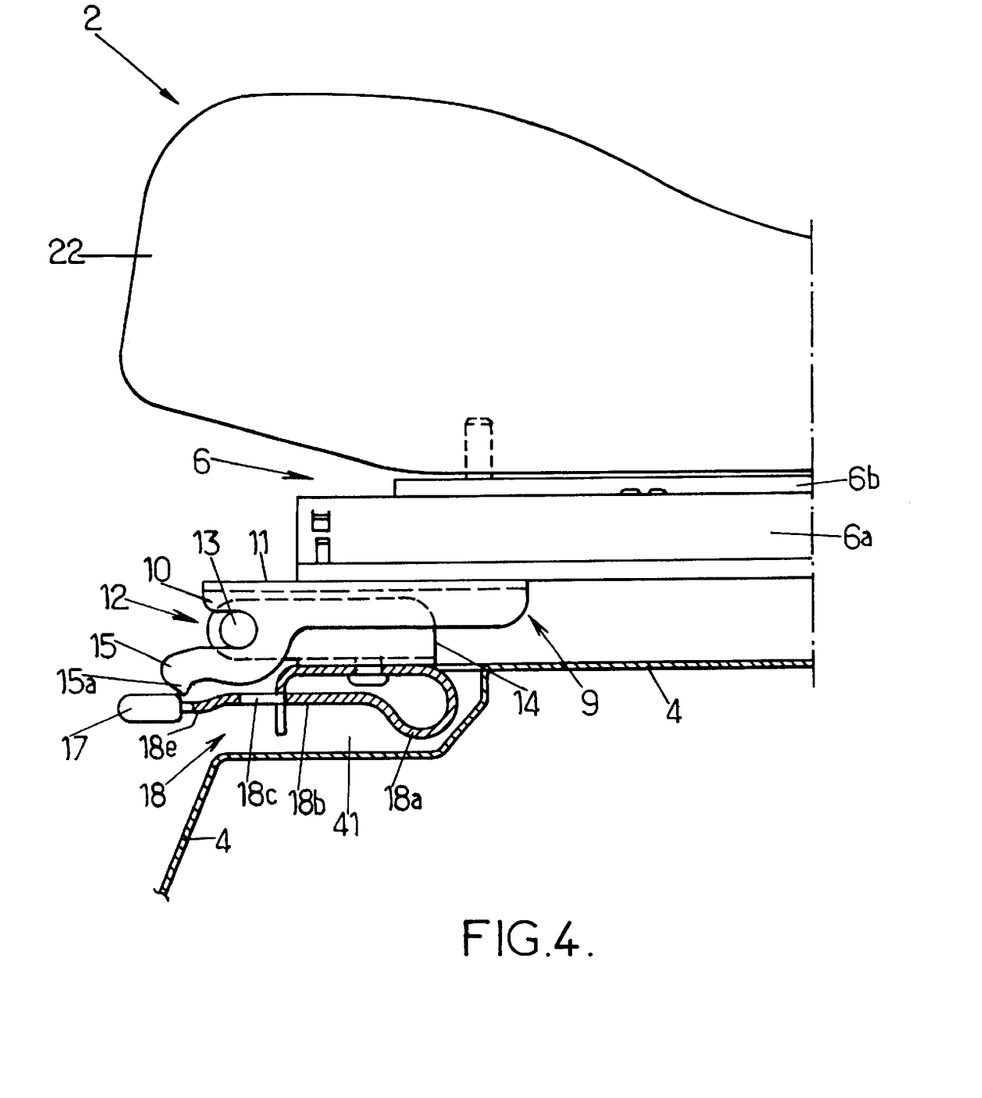
FIG. 4 is an enlarged fragmentary view showing the front coupling of a second embodiment of the fixing device.
Figure 5:
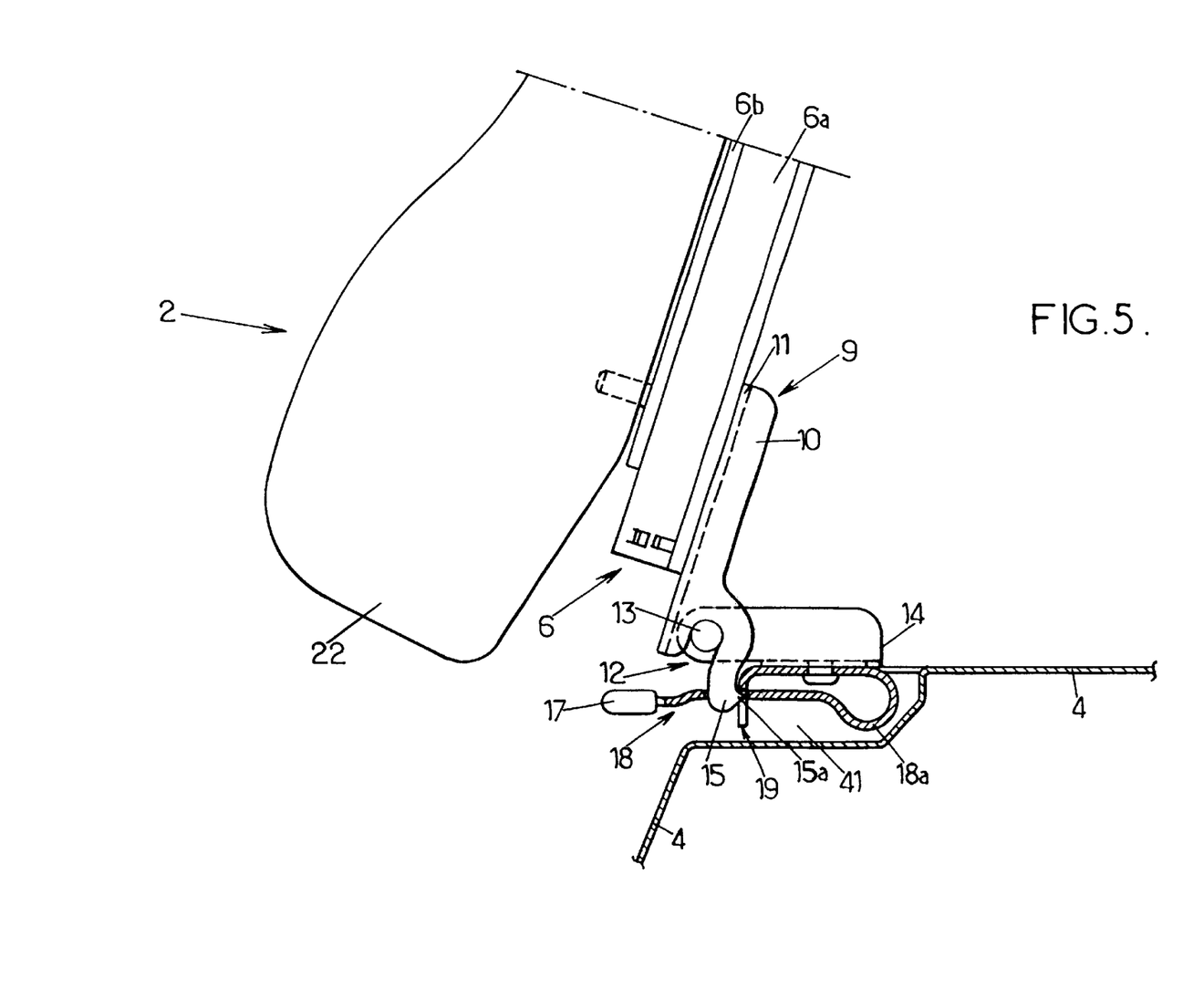
FIG. 5 is a view similar to FIG. 4, with the front coupling of the device being in the tilted-forwards position.
Figure 6:
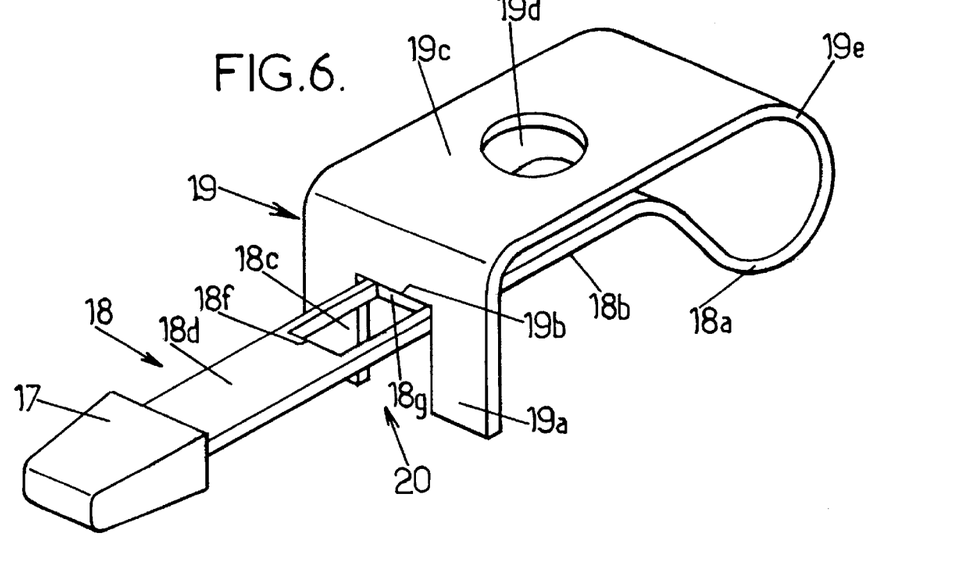
FIG. 6 is a diagrammatic perspective view of the blade serving to lock the anchoring fork of the seat proper when it is in the tilted-forwards position.
Figure 7:
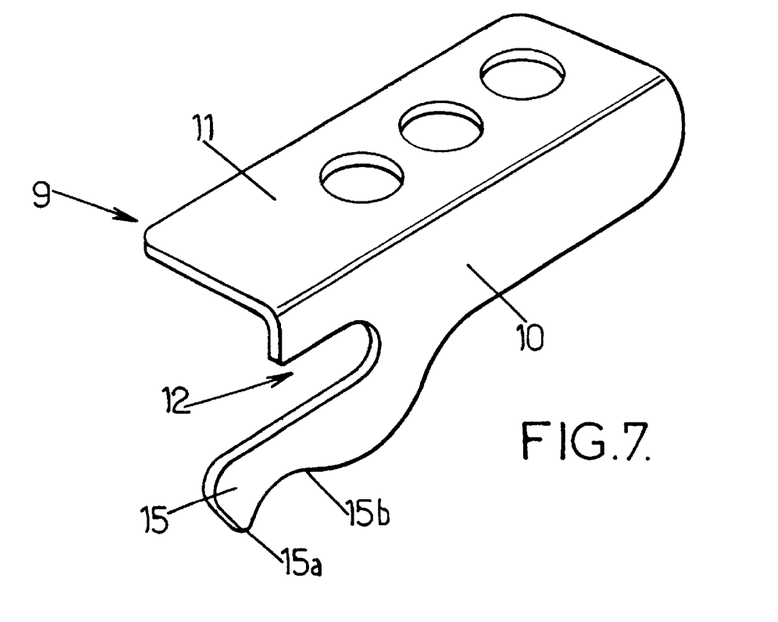
FIG. 7 is a diagrammatic perspective view of the anchoring fork.

Thus, as shown in FIGS. 4 and 5, when a user unlocks the rear couplings 7 of the fixing device, and tilts the seat proper of the seat forwards, the anchoring fork 9, or more exactly the open recess 12 in said anchoring fork, pivots about the transverse horizontal rod 13. While the seat proper 2 is pivoting forwards in this way, the projecting element 15a on the finger 15 then rests on the top face 18d of the elastically deformable blade 18 and pushes it away by deforming it downwards towards the setback 41 in the floor 4 of the vehicle. As it is moving downwards in this way, the elastically deformable blade 18 slides between the two side prongs 19a of the abutment fork 19 until that portion 15b of the bottom face of the finger 15 which is situated above the projecting element 15a, in the tilted-forwards position, comes into abutment against the middle portion 19b of said abutment fork 19.

When the finger 15 on the anchoring fork 9 is in abutment against the middle portion 19b of the abutment fork 19, the finger 15 is also disposed in register with the opening 18c in the elastically deformable blade, thereby enabling said blade 18 to be resiliently returned automatically so as to enable the finger 15 to be engaged in the opening 18c in the blade.

While the blade is being resiliently returned, the opening 18c in the blade comes to hold the finger 15 on the anchoring fork captive, and the blade also returns into abutment against the middle portion 19b of the abutment fork 19.

When the seat proper 2 is in the tilted-forwards position, the projecting element 15a on the finger 15 comes to be received in the notch 20 of the abutment fork 19 while being disposed above the middle portion 19b of the abutment fork. In this tilted-forwards position, the finger 15 on more exactly the projecting element 15a may be in direct contact with the middle portion 19b or may then be disposed in the vicinity of said middle portion 19b with a small amount of clearance.

In said second embodiment, the opening 18c in the elastically deformable blade 18 does not necessarily have to have dimensions complementary to the dimensions of the finger 15 of the anchoring fork 9. It suffices merely for the distance between the front edge 18f of the through opening 18c and the middle portion 19b to be substantially identical to the width of the finger 15 in order to enable the seat proper 2 to be locked to prevent it from pivoting from its tilted-forwards position to its in-use position.

Thus, it can be understood that, by means of the presence of the projecting element 15a on the finger, removing the seat proper 2 from the floor of the vehicle is made impossible by said projecting element 15a being put into contact against the middle portion 19b of the abutment fork 19. When a user wishes to put the seat proper 2 back into its in-use position, it is then necessary merely to move the handle 17 on the elastically deformable blade downwards towards the floor 4 of the vehicle so as to disengage the finger 15 from the opening 18c in the elastically deformable blade, and to pivot the seat proper 2 backwards, i.e. towards its in-use position.

Similarly, when the user wishes to remove the seat of the vehicle from the floor, it is necessary merely to move the handle 17 of the elastically deformable blade 18 downwards so as to disengage the finger 15 from the opening 18c, and to incline the seat proper 2 slightly backwards also to enable the projecting element 15a to be disengaged from the middle portion 19b of the abutment fork 19, and to move the seat proper 2 upwards, thereby enabling the anchoring fork 9 to be disengaged from the transverse horizontal rod 13.

In the example shown in FIGS. 4 and 5, the abutment fork 19 and the elastically deformable blade 18 are made in one piece that is fixed to the support 14 on which the horizontal transverse rod 13 on the floor is also mounted. However, it is also possible to imagine implementing an elastically deformable blade such as the blade shown in FIGS. 2 and 3, and an abutment fork that is distinct from the elastically deformable blade, said abutment fork being either fixed directly to the floor 4 of the vehicle, or else fixed to the support 14.

What is claimed is:

1. A fixing device for fixing a seat to a floor of a vehicle, the seat including a seat proper which extends between a front end and a rear end, said device comprising:

a base serving to support the seat proper; and a rear coupling and a front coupling that are secured to the base, the front coupling comprising an anchoring fork having an open recess serving to co-operate with a horizontal rod secured to the floor to allow the seat to be pivoted between an in-use position in which the rear coupling co-operates with fixing means on the floor to hold the seat proper substantially horizontal, and a tilted-forwards position in which the rear coupling no longer co-operates with the fixing means on the floor so as to enable the seat proper to be inclined relative to the horizontal;

wherein the anchoring fork is provided with a finger which projects substantially forwards when the seat is in the in-use position, and the device further comprises an elastically deformable blade that is secured to the floor and that is provided with a through opening, and wherein the elastically deformable blade is disposed in register with the finger on the anchoring fork so as to make it possible firstly for the finger to push away said elastically deformable blade by deforming it, while the seat proper is pivoting from its in-use position to its tilted-forwards position, and secondly, when the seat proper is in its tilted-forwards position, for the finger to engage in the opening of the blade by said blade returning resiliently, so as to lock the seat proper to prevent it from pivoting from its tilted-forwards position to its in-use position.

2. A device according to claim 1, in which the through opening in the elastically deformable blade has a shape that is complementary to the shape of the finger on the anchoring fork.

3. A device according to claim 1, in which the finger has a top face which defines a bottom portion of the open recess.

4. A device according to claim 1, in which the finger has a bottom face which, when the seat proper is in the tilted-forwards position, serves to come into abutment against an abutment secured to the floor.

5. A device according to claim 4, in which the abutment secured to the floor is in the form of an abutment fork provided with a notch defined by two substantially vertical side prongs separated by a substantially horizontal middle portion, and the bottom face of the finger is provided with a projecting element serving to come to be received in the notch in the abutment fork and facing the middle portion of said notch, when the seat proper is in the tilted-forwards position, so as to prevent the finger from being moved substantially vertically in the opening in the elastically deformable blade.

6. A device according to claim 4, in which the elastically deformable blade and the abutment secured to the floor are made in a single piece.

7. A device according to claim 1, in which the base comprises at least one first rail on which the front coupling and the rear coupling are mounted, and a second rail which is mounted to slide on the first rail and which serves to be fixed to the seat proper of the seat to enable the seat proper to be moved forwards and backwards.

8. A vehicle seat including a seat proper which is mounted on the floor of the vehicle by means of at least one fixing device according to claim 1.

9. A motor vehicle including at least one seat according to claim 8, the vehicle including a transverse horizontal rod that is secured to the floor and a setback in which the elastically deformable blade is disposed at least in part.

* * * * *